United States Patent
Belnap et al.

(10) Patent No.: US 11,008,815 B2
(45) Date of Patent: May 18, 2021

(54) CUTTING ELEMENTS WITH IMPACT RESISTANT DIAMOND BODY

(71) Applicant: SMITH INTERNATIONAL, INC., Houston, TX (US)

(72) Inventors: John Daniel Belnap, Provo, UT (US); Yi Fang, Orem, UT (US); Michael David France, Lehi, UT (US); David P. DenBoer, Pleasant Grove, UT (US); Haibo Zhang, Lindon, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 229 days.

(21) Appl. No.: 15/745,719

(22) PCT Filed: Jul. 20, 2016

(86) PCT No.: PCT/US2016/043026
§ 371 (c)(1),
(2) Date: Jan. 18, 2018

(87) PCT Pub. No.: WO2017/015311
PCT Pub. Date: Jan. 26, 2017

(65) Prior Publication Data
US 2018/0216411 A1 Aug. 2, 2018

Related U.S. Application Data

(60) Provisional application No. 62/195,500, filed on Jul. 22, 2015.

(51) Int. Cl.
*E21B 10/573* (2006.01)
*E21B 10/567* (2006.01)
(Continued)

(52) U.S. Cl.
CPC .......... *E21B 10/5735* (2013.01); *B22F 7/062* (2013.01); *B22F 7/08* (2013.01);
(Continued)

(58) Field of Classification Search
CPC .... E21B 10/50; E21B 10/5673; E21B 10/573; E21B 10/5735; E21B 10/55
See application file for complete search history.

(56) References Cited

U.S. PATENT DOCUMENTS

| 6,719,074 B2 | 4/2004 | Tsuda et al. |
| 7,866,418 B2 | 1/2011 | Bertagnolli |

(Continued)

OTHER PUBLICATIONS

International Preliminary Report on Patentability issued in International Patent Application PCT/US2016/043026 dated Jan. 28, 2018. 13 pages.
(Continued)

*Primary Examiner* — Caroline N Butcher

(57) ABSTRACT

Cutting elements include a diamond-bonded body attached with a substrate. The substrate has a coercivity of greater than about 200 Oe, and has a magnetic saturation of from about 73 to 90. The diamond-bonded body has a compressive stress at the surface of greater than about 0.9 GPa after heat treatment, and greater than about 1.2 GPa prior to heat treatment.

16 Claims, 6 Drawing Sheets

(51) Int. Cl.

| | |
|---|---|
| *C22C 26/00* | (2006.01) |
| *C22C 29/08* | (2006.01) |
| *C04B 35/645* | (2006.01) |
| *C04B 37/02* | (2006.01) |
| *B22F 7/06* | (2006.01) |
| *B22F 7/08* | (2006.01) |
| *B22F 5/00* | (2006.01) |
| *C04B 35/528* | (2006.01) |
| *C04B 35/63* | (2006.01) |
| *E21B 10/50* | (2006.01) |
| *E21B 10/55* | (2006.01) |

(52) U.S. Cl.
CPC ........ *C04B 35/528* (2013.01); *C04B 35/6303* (2013.01); *C04B 35/645* (2013.01); *C04B 37/023* (2013.01); *C04B 37/025* (2013.01); *C04B 37/026* (2013.01); *C22C 26/00* (2013.01); *C22C 29/08* (2013.01); *E21B 10/5673* (2013.01); *E21B 10/573* (2013.01); *B22F 2005/001* (2013.01); *B22F 2302/10* (2013.01); *B22F 2302/406* (2013.01); *C04B 2235/3206* (2013.01); *C04B 2235/3208* (2013.01); *C04B 2235/442* (2013.01); *C04B 2235/96* (2013.01); *C04B 2237/086* (2013.01); *C04B 2237/12* (2013.01); *C04B 2237/363* (2013.01); *C04B 2237/401* (2013.01); *C04B 2237/704* (2013.01); *C04B 2237/72* (2013.01); *E21B 10/50* (2013.01); *E21B 10/55* (2013.01)

(56) References Cited

U.S. PATENT DOCUMENTS

| | | |
|---|---|---|
| 8,763,731 B2 | 7/2014 | Scott et al. |
| 8,764,864 B1 | 7/2014 | Miess et al. |
| 9,234,423 B2 | 1/2016 | Bush et al. |
| 9,562,431 B2 | 2/2017 | Fries et al. |
| 2011/0017519 A1 | 1/2011 | Bertagnolli et al. |
| 2011/0061944 A1* | 3/2011 | Scott ................ B01J 3/062 |
| | | 175/428 |
| 2012/0261196 A1* | 10/2012 | Yu ................ E21B 10/46 |
| | | 175/428 |
| 2013/0264125 A1 | 10/2013 | Miess et al. |
| 2015/0060151 A1* | 3/2015 | Fang ................ E21B 10/46 |
| | | 175/430 |
| 2015/0136495 A1 | 5/2015 | Knuteson et al. |
| 2015/0165590 A1 | 6/2015 | Can et al. |
| 2017/0335633 A1 | 11/2017 | Yu |

OTHER PUBLICATIONS

First Office Action and Search Report issued in Chinese patent application 201680048844.0 dated Dec. 12, 2018, 17 pages.
International Search Report and Written Opinion issued in International Patent application PCT/US2016/043026, dated Oct. 26, 2016. 17 pages.
Second Office Action and Search Report issued in Chinese patent application 201680048844.0 dated Jul. 11, 2019, 16 pages.

* cited by examiner

કટિંગ ELEMENTS WITH IMPACT
RESISTANT DIAMOND BODY

BACKGROUND

Cutting elements, such as those used with bits for drilling earth formations, known in the art include a diamond surface layer or diamond table disposed on a carbide substrate. The diamond table is used to provide properties of improved wear and abrasion resistance, relative to the underlying substrate, and the substrate is used to provide an attachment structure to facilitate attachment of the cutting element to an end-use machine tool, e.g., a drill bit or the like.

Such known cutting elements have a diamond layer or diamond table formed from polycrystalline diamond (PCD) and make use of a carbide substrate such as WC—Co. While the diamond layer operates to provide improved wear and abrasion resistance to the cutter, e.g., when compared to cutting elements having a wear surface formed from tungsten carbide, the diamond layer in such known cutting elements is susceptible to breaking and/or fracturing as a result of being placed into downhole drilling conditions and being subjected to the impact forces imposed on the diamond layer as a result of such use. The breaking/fracturing and/or crack formation in the diamond layer of such cutting elements is not desired as such operates to limit or reduce the effective service life of the cutting elements.

Attempts to improve the service life of such cutting elements have focused on issues involving the delamination or breakage of the diamond body from the substrate, and have included reducing the residual compressive stress at the diamond layer-substrate interface, e.g., by heat treating the cutting elements. While such efforts may be useful in reducing or minimizing instances of breakage or delamination of the diamond body from the substrate, such performance gains are provided at the expense of compromising the wear resistance and resistance to breakage, fracture and/or crack initiation at the surface of the diamond table caused by impact forces encountered during use, which as noted above also may operate to limit the effective service life of the cutting element.

SUMMARY

Cutting elements as disclosed herein include a diamond-bonded body comprising polycrystalline diamond connected with a substrate. The cutting element may include one or more transition layers interposed between the diamond-bonded body and substrate. All or a portion of the diamond-bonded body may comprise a thermally stable region that has been treated to remove a catalyst material therefrom or render the catalyst material noncatalytic to diamond at elevated temperatures.

The substrate used to form cutting elements disclosed herein comprises cemented tungsten carbide and may include chromium carbide. The substrate has a coercivity greater than about 200 Oe, and has a magnetic saturation of from 73 to 87 percent. In an example, the substrate comprises carbide grains having an average grain size of less than about 1 micrometer. The cutting element diamond-bonded body has a compressive stress higher than conventional polycrystalline diamond cutting elements of greater than about 0.9 GPa, and greater than 1.2 GPa, which increased compressive stress provides improved impact performance that extends cutting element service life.

Cutting elements are made by subjecting an assembly of diamond grains to high-pressure/high-temperature processing conditions in the presence of a catalyst material to form the polycrystalline diamond body and attach the body to the substrate. If desired, cutting elements can be formed at ultra-high pressure conditions.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages of cutting elements as disclosed herein will be appreciated as the same becomes better understood by reference to the following detailed description when considered in connection with the accompanying drawings wherein.

DETAILED DESCRIPTION

In an example, cutting elements as disclosed herein include a diamond-bonded body comprising polycrystalline diamond (PCD) that forms a working or wear surface of the cutting element. The diamond-bonded body is joined with a substrate that has been specially engineered to enhance the compressive stress of the diamond-bonded body to thereby provide an improved degree of impact performance when compared to cutting elements comprising conventional substrates. The cutting element diamond-bonded body may include a thermally stable region and/or the cutting element may include one or more intermediate layers interposed between the diamond-bonded body and the substrate. Cutting elements as disclosed herein are engineered to provide an improved level of impact resistance without compromising properties of wear and abrasion resistance, thereby increasing the operational service life of such cutting elements.

Figure 1:
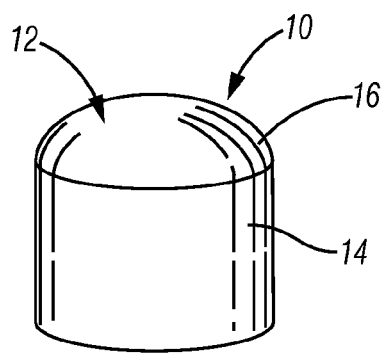
FIG. 1 illustrates a perspective side view of an example cutting element as disclosed herein.
Figure 2:
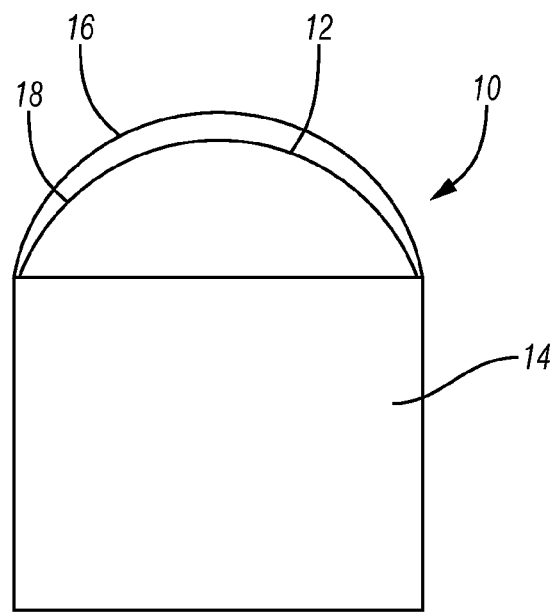
FIG. 2 illustrates a side cross-sectional view of an example cutting element as disclosed herein.

FIGS. 1 and 2 illustrate an example cutting element 10 as disclosed herein including a diamond-bonded body 12 attached with a substrate 14, in an example the cutting element has a sidewall configuration that is generally cylindrical in shape. The diamond-bonded body 12 comprises a working or wear surface that may exist along a top surface 16 of the body and/or along a sidewall surface of the body 12. Referring to FIGS. 1 and 2, diamond-bonded body 12 may be configured having a top surface 16 that is planar or nonplanar depending on the particular end-use application. In the illustrated example, the cutting element diamond-bonded body has top surface that is nonplanar, e.g., that is configured in the shape of a dome. It is to be understood that diamond-bonded bodies having other nonplanar shapes are understood to be within the scope of the cutting elements as disclosed herein. For example, the diamond-bonded top surface may be configured having a pointed geometry with an apex that is relatively sharp that forms a tip of the diamond table or surface, or the top surface may be configured having chisel-shaped tip (see FIG. 9) that may extend diametrically along the diamond-bonded body and that is formed along the intersection of two planar surface features.

As illustrated in FIG. 2, the cutting element 10 may have a nonplanar interface 18 between the substrate 14 and the diamond-bonded body 12. It is understood that cutting elements as disclosed herein may be configured having an interface between the substrate and the diamond-bonded body that is planar or that is in some other nonplanar configuration, e.g., that is shaped or that include one or more surface features or irregularities that detract from an otherwise planar interface, and that may operate to provide an improved degree of mechanical attachment at the interface between the diamond-bonded body and the substrate.

The diamond-bonded body 12 may be provided in the form of a single layer or multiple layers, and in an example, the diamond-bonded body is formed from PCD. As illustrated in FIG. 2, in an example, the diamond-bonded body 12 is formed from a single diamond layer. It is understood that cutting elements as disclosed herein may have a diamond-bonded body that is formed from more than one diamond layers. While the example of FIG. 2 illustrates a cutting element where the diamond-bonded body 12 is joined or otherwise attached directly to the substrate 14, cutting elements as disclosed herein may include one or more intermediate or transition layers interposed between the diamond-bonded body 12 and the substrate 14.

Figure 3:
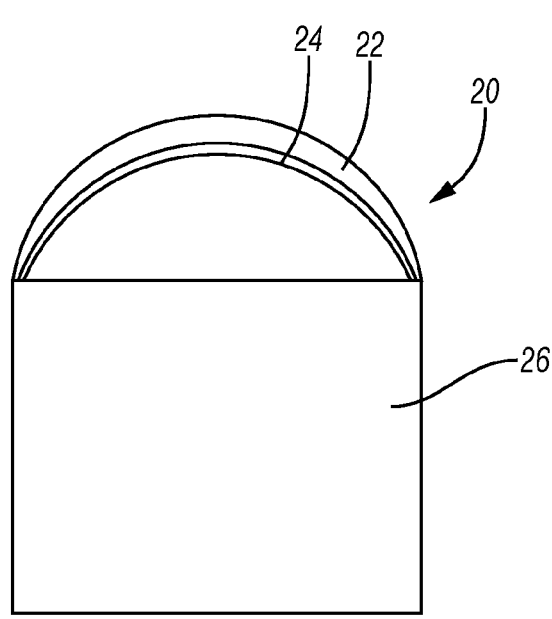
FIG. 3 illustrates a side cross-sectional view of an example cutting element as disclosed herein comprising a thermally stable region.

FIG. 3 illustrates an example cutting element 20 including a diamond-bonded body 22 that is disposed onto and bonded with an intermediate or transition layer 24, which transition layer 24 is interposed between the diamond-bonded body 22 and the substrate 26 and is bonded to the substrate. While a particular example has been illustrated having one transition layer, interposed between the diamond-bonded body and the substrate, it is to be understood that cutting elements as disclosed herein may have more than one transition layer, depending on such factors as the materials used to form the diamond-bonded body and the substrate, and the particular end-use application. In an example, the transition layer may comprise PCD and have a diamond volume content that is different from that of the diamond-bonded body.

In an example, the transition layer may have a diamond volume content that is less than the diamond volume content of the diamond-bonded body, and/or may have a volume content of other non-diamond constituents that is greater than the volume content of any such other non-diamond constituents in the diamond-bonded body. In an example, the transition layer has a diamond volume content that is less than that of the diamond-bonded body and/or that includes volume content of a non-diamond constituent material greater than that of the diamond-bonded body to provide a transition between the different coefficients of thermal expansion of the diamond-bonded body and the substrate. Such non-diamond constituent material may include, and not be limited to, cobalt and particles of a metal carbide or metal carbonitride, such as a carbide or carbonitride of W, Ta, Ti or mixtures thereof. For example, the metal carbide may be tungsten carbide.

When multiple intermediate or transition layers are present, the transition layers may create a gradient with respect to the diamond volume content where the diamond volume content decreases between the transition layers, moving away from the diamond-bonded body and toward the substrate. A cutting element including a single intermediate layer may also include a gradient of diamond content therein, where a region of the intermediate layer near the diamond-bonded body has a diamond volume content greater than that of a region of the intermediate layer near the substrate.

In an embodiment, the PCD used for making cutting elements as disclosed herein includes a material microstructure made up of an intercrystalline matrix of bonded-together diamond grains with a plurality of interstitial regions dispersed within the matrix, wherein the interstitial regions are populated with a catalyst material such as that used to form the PCD at high-pressure/high-temperature (HPHT) sintering conditions. Catalyst materials useful for making PCD include conventional solvent metal catalyst materials such as those selected from Group VIII of the CAS version of the Periodic Table. In an example, the PCD may have a diamond volume content of from about 80 to 99, or from about 82 to 96 percent based on the total volume of the materials used to form the PCD. In an example, the PCD may have a catalyst volume content of from about 1 to 20, or from about 10 to 18 percent based on the total volume of the materials used to form the PCD. In an example, the PCD has a diamond volume content of about 94.5 percent by volume, and a catalyst content of about 5.5 percent by volume. The diamond grains used for making the diamond-bonded body may have an average diamond grain size of about 30 micrometers or less, and from about 10 to 30 micrometers.

Figure 4:
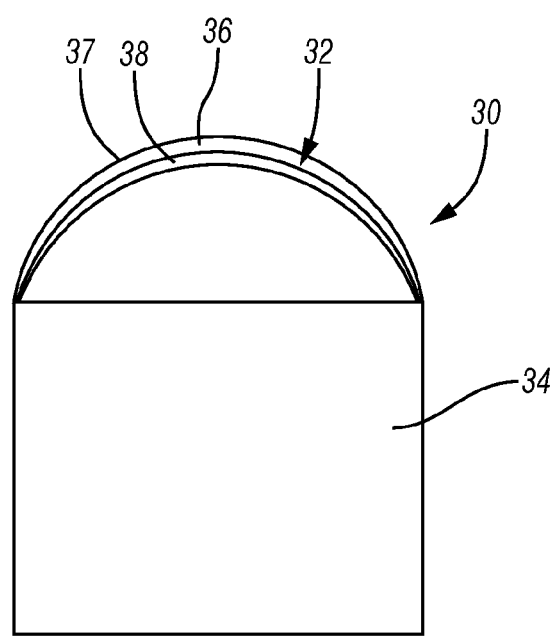
FIG. 4 illustrates a side cross-sectional view of an example cutting element as disclosed herein having at least one transitional layer.

In an example, the PCD used to form cutting elements as disclosed herein includes the catalyst material used to sinter the same. In an example, the catalyst material may be cobalt, iron, nickel, or a combination thereof. In such embodiment, the catalyst material is disposed within the interstitial regions. FIG. 4 illustrates an example cutting element 30 as disclosed herein comprising the diamond-bonded body 32 as attached with the substrate 34, wherein at least a portion of the diamond-bonded body has been treated to remove the catalyst material from the interstitial regions, e.g., so that such interstitial regions are substantially free of the catalyst material, or treated to otherwise render the catalyst material in such interstitial regions thermally stable and noncatalytic to diamond. The portion of the diamond-bonded body 32 that is treated in this manner is thermally stable and may be referred to as the thermally stable portion or region 36. In an example, the diamond-bonded body 32 may include a thermally stable region 36 that extends a partial depth from the working surface 37, wherein a remaining region 38 of the diamond-bonded body that is not treated comprises interstitial regions having the catalyst material still disposed therein, wherein such non-treated region may extend from the thermally stable region 36 to the substrate 34. If desired, the entire diamond-bonded body may be treated so that it is completely thermally stable, e.g., so that the interstitial regions throughout the entire diamond body is substantially free of the catalyst material used to sinter the diamond-bonded body. In some embodiments, the use of thermally stable binder materials such as carbonates may be employed as the solvent catalyst, examples include and are not limited to alkali metal or alkaline earth carbonates such as calcium or magnesium carbonates.

In an example, the cutting elements as disclosed herein have a diamond-bonded body with a thickness at the top surface that is greater than about 0.6 mm, or greater than about 0.8 mm. In an example, the diamond table has a thickness of from about 0.6 mm to 5 mm, from about 0.6 to 4 mm, or from about 0.8 mm to 3 mm. In an example, the maximum diamond-bonded body thickness is approximately 4 mm.

Cutting elements as disclosed herein are specially engineered so that the diamond-bonded body have a high compressive stress as measured at a working surface, e.g., as measured at the top surface of the diamond-bonded body as contrasted to conventional diamond cutting elements (e.g., diamond enhanced inserts). Such high compressive stress operates to increase the impact resistance or impact performance of the diamond-bonded body when the cutting element is placed into use. In an example, cutting elements as disclosed herein are engineered to have a high diamond-bonded body compressive stress as measured at a working surface of about 0.9 GPa or greater, and about 1.2 GPa or greater.

Cutting elements as disclosed herein comprise a substrate that is believed to give rise to the improvements in compressive stress and resulting improved impact resistance and performance noted above. Substrates useful for forming cutting elements as disclosed herein are ones that are different from conventional cemented tungsten carbide substrates used to form known PCD cutting elements. Specifically, substrates used to form the cutting elements as disclosed herein comprise cemented tungsten carbide (WC—Co), and also comprise an amount of chromium carbide. In an example, such substrate may comprise from about 0.02 to 2 percent by weight, from about 0.5 to 1 percent by weight, and less than about 1 percent by weight chromium carbide based on the total weight of the substrate, wherein the remaining material present in the substrate is WC—Co. In an example, the substrate may comprise about 10 percent by weight cobalt, and the carbide grain size may have an average particle diameter of less than about 1 micrometer. A further feature of substrates used to form cutting elements as disclosed herein is that they have a high coercivity as compared to conventional cemented tungsten carbide substrates used to form known PCD cutting elements. Specifically, substrates as used herein have a coercivity of about 200 Oe or greater, and from about 210 to 300 OE. A further characteristic of such substrates used to form cutting elements as disclosed herein is that they have a magnetic saturation that is relatively lower than that of conventional cemented tungsten carbide substrate used to form known PCD cutting elements. Specifically, substrates as disclosed herein have a magnetic saturation as low as 73 percent, and that may be from about 73 to 90 percent.

Tests were conducted for the purpose of evaluating the effect of using the substrates as disclosed above in forming cutting elements as disclosed herein on the compressive stress measured along a surface of the diamond-bonded body when compared to conventional PCD cutting elements, i.e., PCD cutting elements formed using known cemented tungsten carbide substrates. In such tests, the compressive stress of the cutting elements made as disclosed herein (comprising a diamond-bonded body formed from diamond grains having an average grain size of about 25 to 17 micrometers and the substrate as disclosed above) was compared to that of cutting elements comprising a similar diamond-bonded body but joined with conventional WC—Co substrates comprising approximately 13 weight percent cobalt and having an average carbide grain size of 2-3 micrometers. The compressive stress was measured according to the method disclosed below (and illustrated in FIG. 5) for both the cutting elements as disclosed herein and the conventional PCD cutting elements both before being subjected to a heat treatment condition of approximately 625° C. (for purposes of reducing residual stress in the cutting elements) and after being subjected to such heat treatment condition. The test results demonstrated that the cutting elements as disclosed herein made with the above-described substrate displayed a compressive stress that was approximately 1.2 GPa, or 140 to 230 MPa greater than that of the conventional PCD cutting element before heat treatment, and displayed a compressive stress that was approximately 0.9 GPa, or 220 to 330 MPa greater than that of the conventional PCD cutting element after heat treatment.

The increase in the compressive stress of the diamond-bonded body of the cutting elements as disclosed herein was a surprising and unexpected result attributed to use of the substrate as disclosed above. It is theorized that such a fine-grained substrate affects the infiltration characteristics of a solvent catalyst material from the substrate into the PCD in a way that is different from that of conventional PCD cutting element substrates, which in turn operates to redistribute the infiltrating solvent catalyst such that it increases the compressive stress of the diamond-bonded body. This increase in the compressive stress of the diamond-bonded body operates to provide an improved degree of impact performance that functions to minimize or eliminate crack development, breaking or other impact-related damage to the diamond-bonded body when the cutting element is placed into use, thereby increasing the service life of the cutting elements as disclosed herein. Further, it is believed that the increase in compressive stress displayed by the cutting elements as displayed herein prior to heat treatment and the mechanical properties of the finer-grained carbide substrate (which heat treatment is conventionally used to reduce residual stress within the carbide portion of the cutting element) may be sufficient such that subsequent heat treatment may not be needed for certain end-use applications, thereby operating to reduce manufacturing time and costs associated with making cutting elements.

Figure 5:
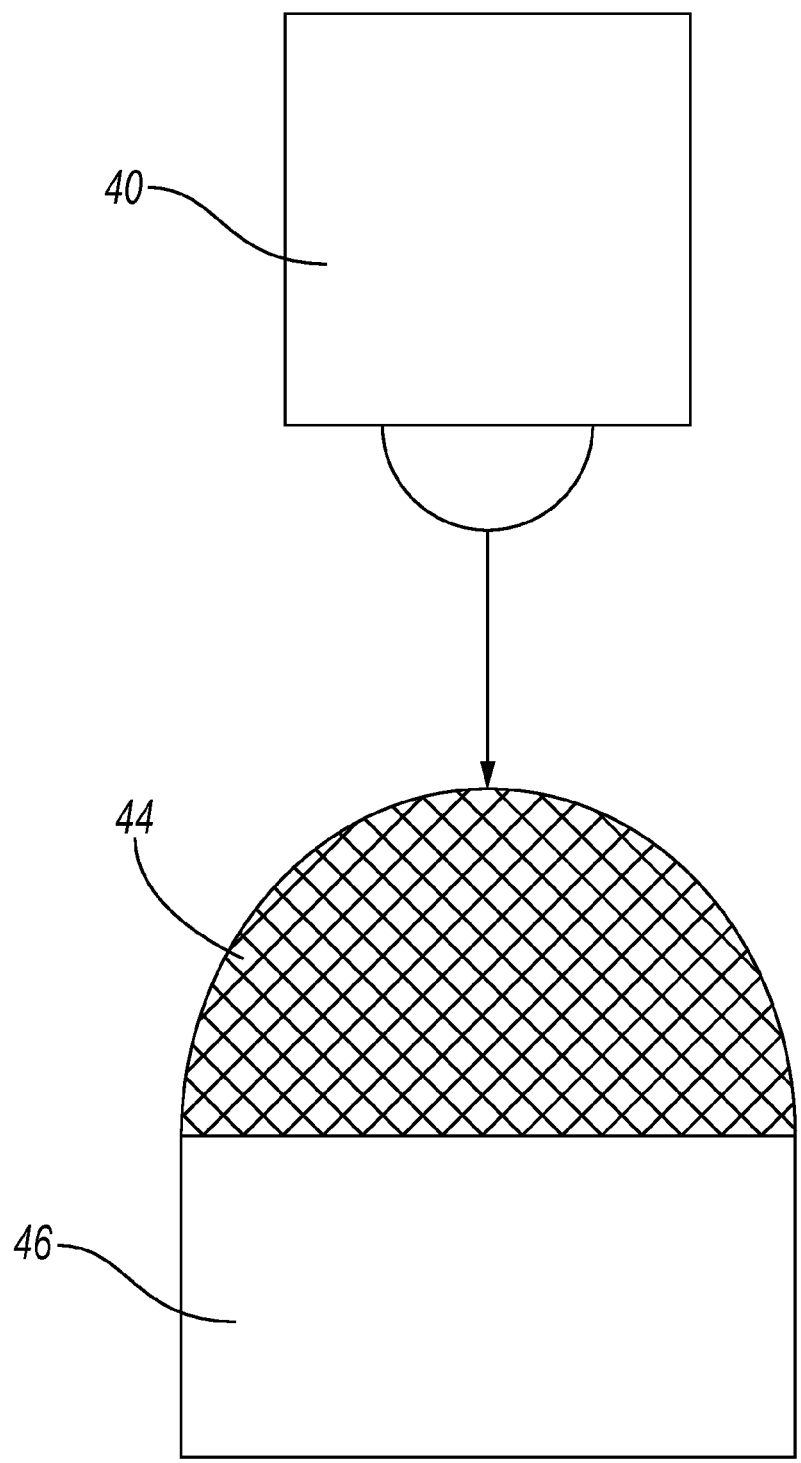
FIG. 5 illustrates a test configuration for a compressive stress analysis.

The surface compression stress of the diamond-bonded body as described above was measured, e.g., by using Raman spectroscopy as described below as follows:

FIG. 5 illustrates a schematic of a configuration useful for measuring such tests. Laser probe 40 is directed at the apex of the polycrystalline diamond dome 44 of cutting element 46. Diamond has a single Raman-active peak, which under stress free conditions is located at $\omega_0 = 1332.5$ cm$^{-1}$. For polycrystalline diamond, this peak is shifted with applied stress according to the relation:

$$\Delta\omega = \frac{\omega_0 \gamma}{B} \sigma_H$$

where $\Delta\omega$ is the shift in the Raman frequency, $\gamma$ is the Grunesian constant, equaling 1.06, B is the bulk modulus, equaling 442 GPa, and $\sigma_H$ is the hydrostatic stress. $\sigma_H$ is defined as:

$$\sigma_H = \frac{\sigma_1 + \sigma_2 + \sigma_3}{3}$$

where $\sigma_1$, $\sigma_2$, and $\sigma_3$ are the three orthogonal stresses in an arbitrary coordinate system, the sum of which equals the first stress invariant. In the center of the apex of an insert, it is reasonable to assume equibiaxial conditions ($\sigma_1=\sigma_2=\sigma_B$ and $\sigma_3=0$). In which case, the relation between the biaxial stress $\sigma_B$ and the peak shift is given by:

$$\Delta\omega = \frac{2\omega_0 \gamma}{3B}\sigma_B.$$

The cutting elements were characterized using Raman spectroscopy and fatigue contact testing. The equipment used to collect the Raman spectra employed a near-infrared laser operating at 785 nm, a fiber optic lens/collection system and a spectrometer incorporating a CCD-array camera. The peak centers were determined by fitting a Gaussian curve to the experimental data using intrinsic fitting software. The Gaussian expression is given by:

$$I(x) = I_0 \exp\left[\ln 0.5 \frac{(x-\omega_C)^2}{(w/2)^2}\right]$$

where $I(x)$ is the intensity as a function of position, $I_0$ is the maximum intensity, $\omega_C$ is the peak center, and w is the peak width, i.e., the full width at half maximum intensity. In this analysis, the fitted peak center was used to determine the compressive stress.

Cutting elements as disclosed herein may be formed by subjecting an assembly including a volume of diamond grains positioned adjacent a substrate to high-pressure/high-temperature (HPHT) processing conditions. In embodiments where the cutting element includes one or more transition layers, the precursor materials useful for forming such transition layer(s) are disposed within the assembly between the volume of diamond grains and the substrate. The diamond grains and any intermediate or transition layer material may be provided in powder form or other green-state form, e.g., in the form of a bound-together construction such as a tape or the like where the diamond grains or transition layer materials are bound together using a binder or the like for purposes of facilitating assembly and manufacturing.

Briefly, to form the diamond-bonded body, an unsintered mass of diamond grains or crystalline particles is placed within a metal enclosure or assembly of a reaction cell of a HPHT apparatus. A metal catalyst, such as cobalt, and tungsten carbide particles may be included with the unsintered mass of crystalline particles or may be present and provided from the substrate. Any transition layer may similarly be formed by placing an unsintered mass of the composite material containing diamond particles, tungsten carbide and cobalt within the HPHT apparatus. The substrate is included in the reaction cell and is positioned adjacent the volume of diamond grains used to form the diamond-bonded body or adjacent any intermediate or translation layer precursor materials. The reaction cell is then placed under HPHT processing conditions sufficient to cause sintering of the material to create the PCD diamond-bonded body, any intermediate or transition layer, and to bond the so-formed PCD body to the substrate.

In an example embodiment, the cutting elements as disclosed herein are formed by subjecting the assembly to a HPHT process condition where the pressure is from about 5,500 to 7,000 MPa and the temperature is from about 1,300 to 2,000° C. for a period of time sufficient to ensure formation of the fully sintered PCD body and attachment of the PCD body with the substrate. In some instances it is desired that cutting elements as disclosed herein be sintered at HPHT process conditions including ultra-high pressure conditions of greater than about 7,000 MPa, and in the range of from about 7,500 to 15,000 MPa, with processing temperatures in the range 1,500 to 2,500° C.

Cutting elements as disclosed herein may be used in a number of different applications, such as tools for mining, cutting, machining, milling and construction applications, where properties of wear resistance, abrasion resistance, toughness, and mechanical strength, and/or reduced thermal residual stress, e.g., caused by mismatched coefficient of thermal expansion, are highly desired. Cutting elements as disclosed herein are particularly well suited for use in machine tools and drill and mining bits such as roller cone rock bits, percussion or hammer bits, drag bits, fixed blade bits, and the like used in subterranean drilling applications. Accordingly, it is to be understood that the cutting elements as disclosed herein may be used in any of the above-noted types of drill and mining bits depending on the particular end-use application.

Figure 6:
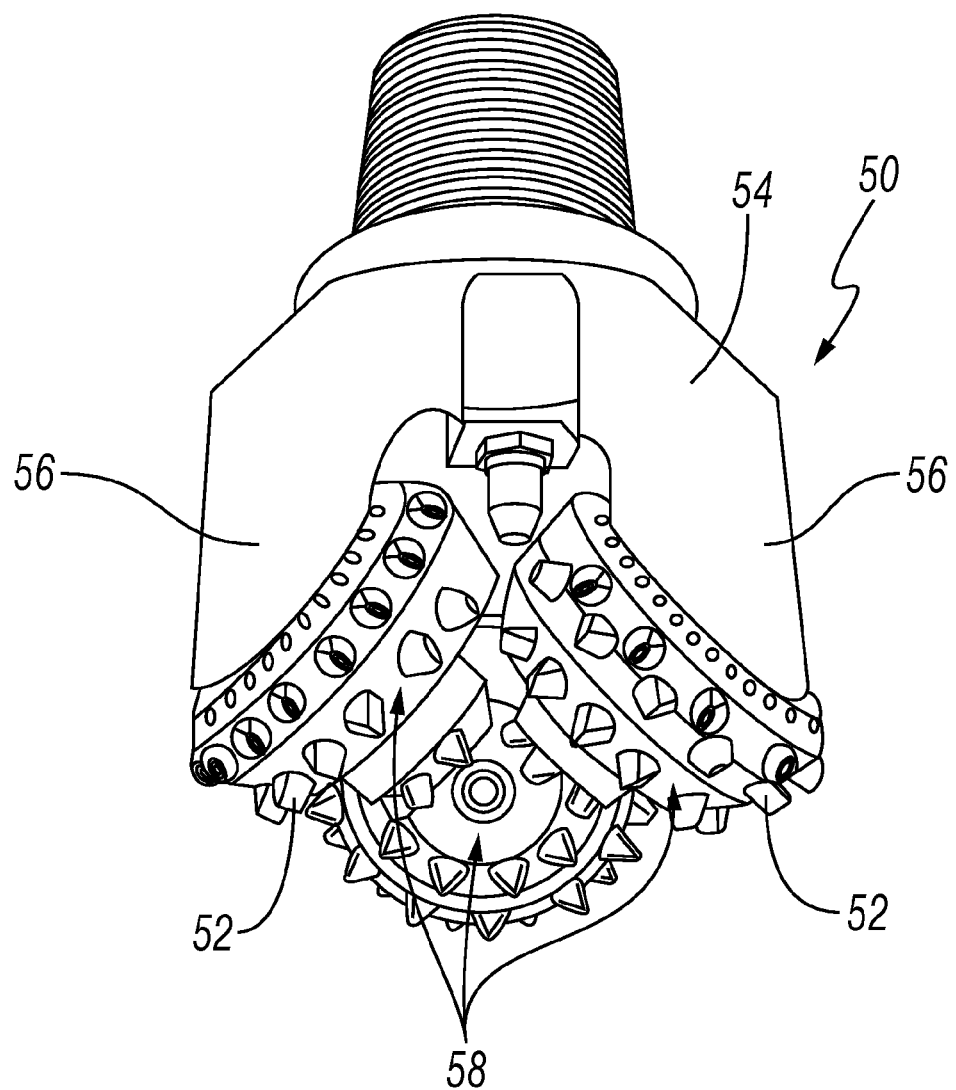
FIG. 6 is a perspective view of a rotary cone drill bit including example cutting elements as disclosed herein.

FIG. 6 illustrates a rotary or roller cone drill bit in the form of a rock bit 50 including a number of the cutting elements 52 as disclosed herein. The rock bit 50 includes a body 54 having three legs 56, and a roller cutter cone 58 mounted on a lower end of each leg. The cutting elements or inserts 52 may be fabricated according to the method described above. The cutting element or inserts 52 are provided in the surfaces of each cutter cone 58 for bearing on a rock formation being drilled.

Figure 7:
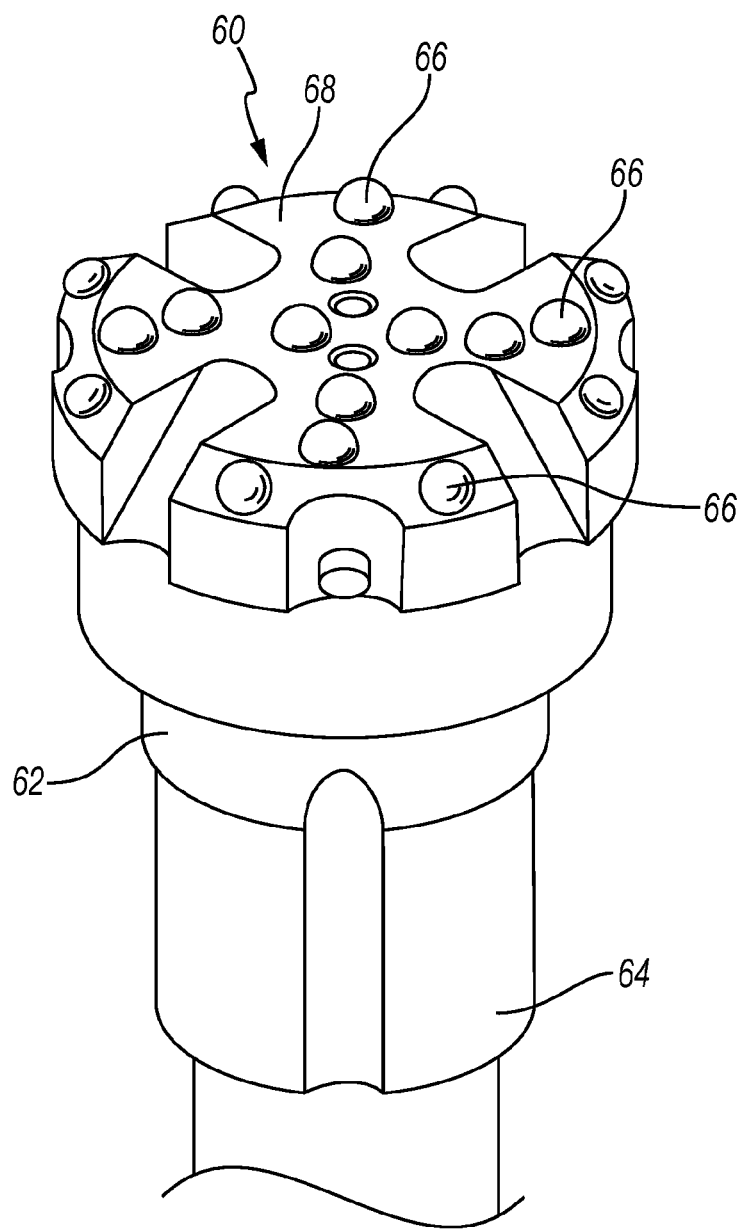
FIG. 7 is a perspective view of a hammer drill bit including example cutting elements as disclosed herein.

FIG. 7 illustrates the cutting elements or inserts described above as used with a percussion or hammer bit 60. The hammer bit includes a hollow steel body 62 having a threaded pin 64 on an end of the body for assembling the bit onto a drill string (not shown) for drilling oil wells and the like. A plurality of the cutting elements 66 as disclosed herein are provided in the surface of a head 68 of the body 62 for bearing on the subterranean formation being drilled.

Figure 8:
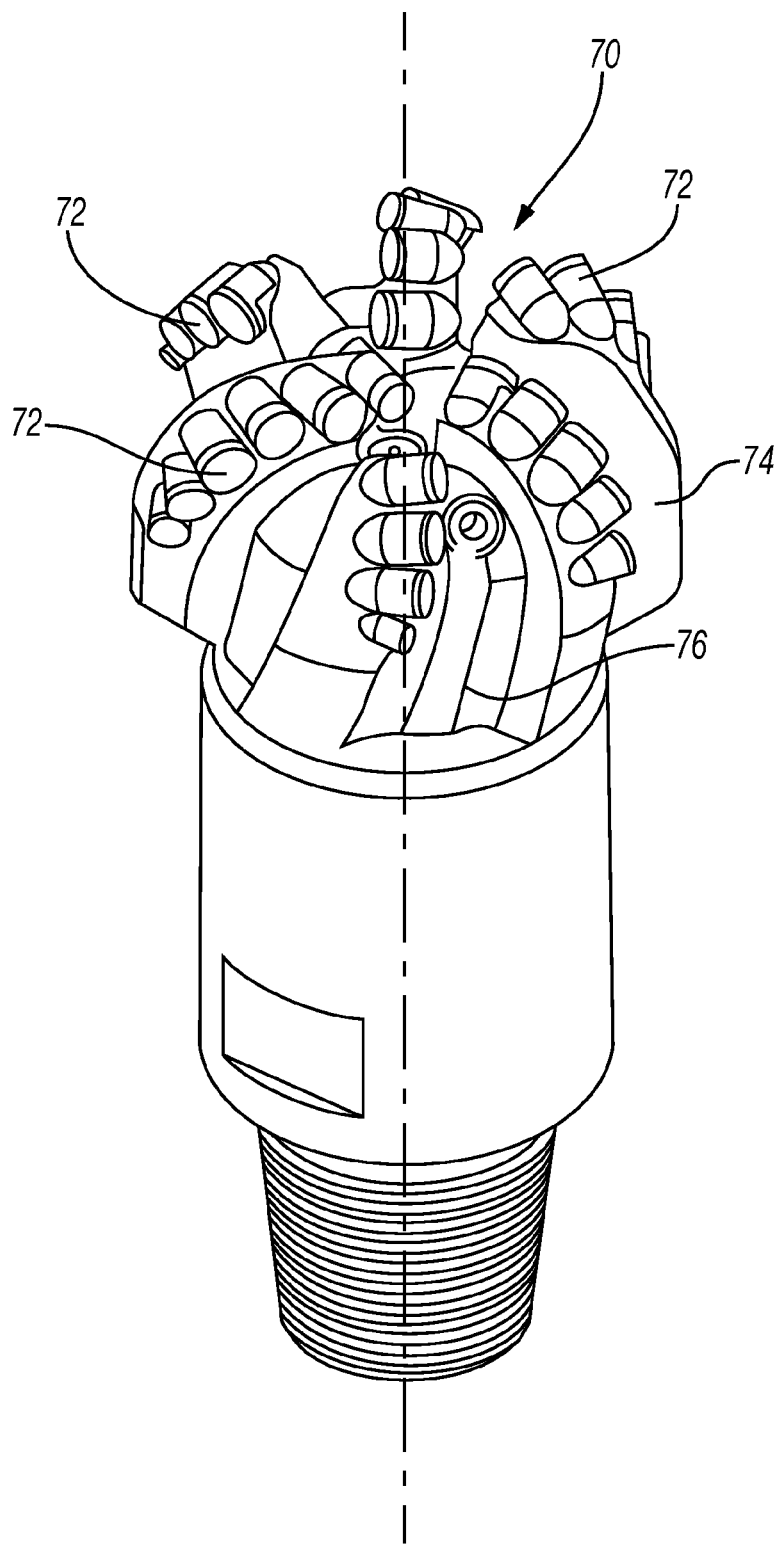
FIG. 8 is a perspective view of a drag drill bit including example cutting elements as disclosed herein.

FIG. 8 illustrates a drag bit 70 for drilling subterranean formations including a number of the cutting elements 72 that are each attached to blades 74 that extend from a head 76 of the drag bit for cutting against a subterranean formation being drilled.

Figure 9:
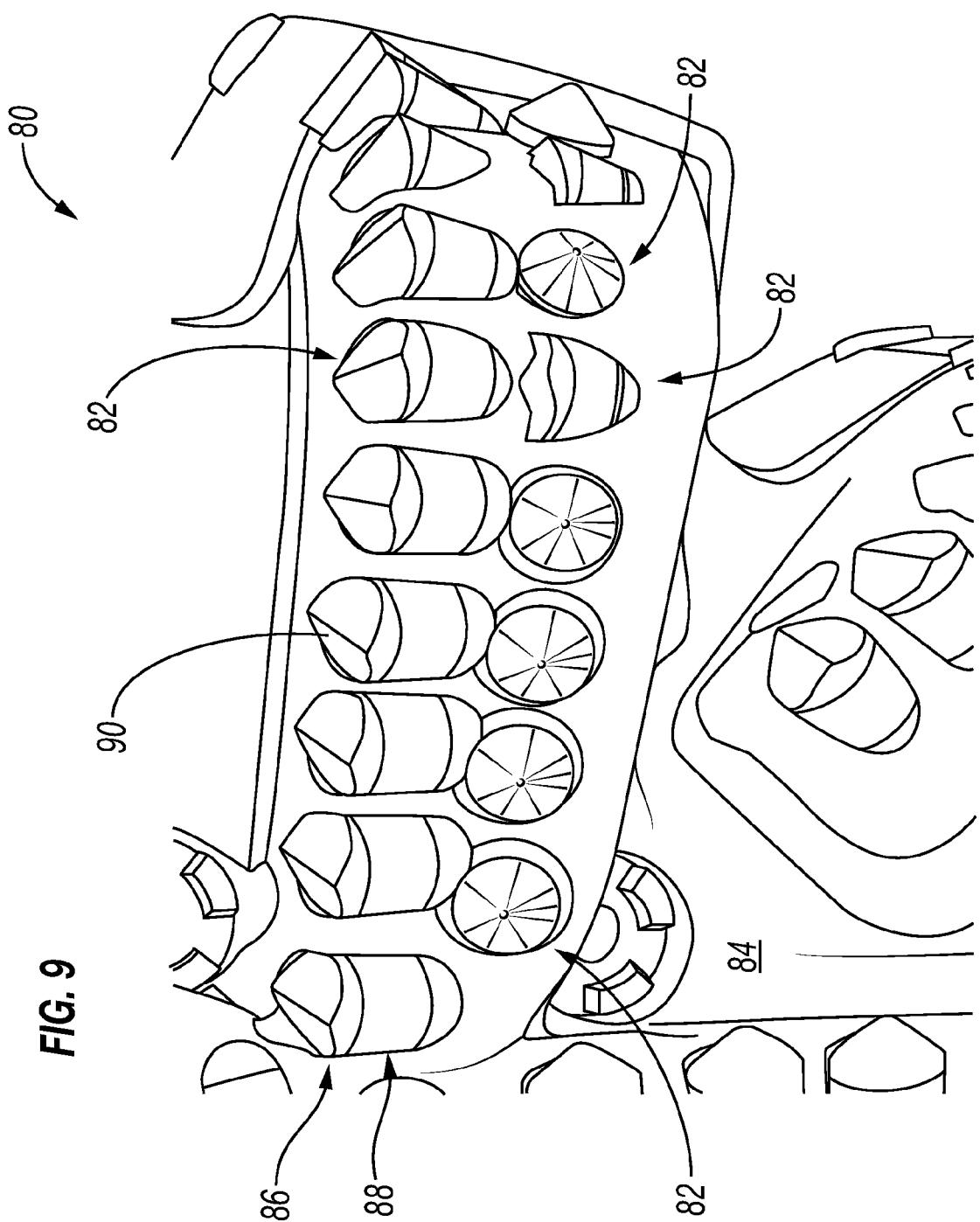
FIG. 9 is a perspective view of a section of a drill bit including example cutting elements as disclosed herein.

FIG. 9 illustrates a section of a fixed blade drag bit 80 for drilling subterranean formations including a number of the cutting elements 82 that are each attached to and extend from a head 84 of the drag bit for cutting against a subterranean formation being drilled. The cutting elements 82 of this example comprise a diamond-bonded body 86 attached with a substrate 88, wherein the diamond-bonded body has a chisel-shaped tip 90.

Although only a few example embodiments of cutting elements have been described in detail above, those skilled in the art will readily appreciate that many modifications are possible in the example embodiments without materially departing from the concepts as disclosed herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A cutting element comprising:
   a polycrystalline diamond body having a working surface and comprising a plurality of bonded-together diamond crystals forming an intercrystalline diamond matrix having a plurality of interstitial regions dispersed within the matrix; and
   a substrate connected with the body and comprising cemented tungsten carbide, wherein prior to a high pressure/high temperature process to attach the substrate to the diamond body, the substrate has a coercivity of greater than about 200 Oe,
   wherein the diamond body has a compressive stress at the working surface of greater than about 1.2 GPa as measured after the diamond body is formed and joined to the substrate by the high pressure/high temperature process without quenching and before any treatment of the cutting element subsequent to the high pressure/high temperature process, and wherein the diamond body has a compressive stress at the working surface of greater than about 0.9 GPa measured after a heat treatment process subsequent to the high pressure/high temperature process, the heat treatment process being greater than about 500° C.

2. The cutting element as recited in claim 1 wherein the substrate has a coercivity of from about 200 to 300 Oe.

3. The cutting element as recited in claim 1 wherein the substrate has a magnetic saturation of from about 73 to 90 percent.

4. The cutting element as recited in claim 1 wherein the substrate comprises a metal selected from the group consisting of Co, Ni, Fe and combinations thereof, and wherein the substrate further comprises chromium carbide.

5. The cutting element as recited in claim 4 wherein the substrate comprises from about 0.02 to 2 percent by weight chromium carbide based on the total weight of the substrate.

6. The cutting element as recited in claim 1 wherein the carbide in the substrate has a grain size of less than about 1 micrometer.

7. The cutting element as recited in claim 1 further comprising an intermediate layer interposed between the body and the substrate, the intermediate layer comprising polycrystalline diamond and having a diamond volume content different from a diamond volume content of the body.

8. The cutting element as recited in claim 1 wherein the body comprises a thermally stable region extending at least a partial depth as measure from the working surface, wherein the interstitial regions in the thermally stable region are substantially free of a catalyst material used to form the body by the high pressure/high temperature process.

9. The cutting element as recited in claim 8 wherein the body includes a region independent of the thermally stable region that comprises interstitial regions comprising the catalyst material disposed therein.

10. A bit for drilling subterranean formations, the bit comprising a body and a number of the cutting elements as recited in claim 1 operatively attached to the body.

11. A method for making a cutting element comprising:
    subjecting a volume of diamond grains to a high pressure/high temperature process in the presence of a catalyst material to form a diamond-bonded body comprising an intercrystalline matrix of bonded-together diamond with interstitial regions disposed within the matrix, the diamond-bonded body having a working surface; and
    joining a substrate to the diamond body during the step of forming, the substrate comprising tungsten carbide with one or more material selected from the group consisting of Co, Fe, Ni, and combinations thereof, wherein prior to joining the substrate to the diamond body during the step of forming, the substrate has a coercivity of greater than about 200 Oe,
    wherein the diamond body has a compressive stress at the working surface of greater than about 1.2 GPa as measured after the diamond body is formed and joined to the substrate by the high pressure/high temperature process without quenching and before any treatment of the cutting element subsequent to the high pressure/high temperature process.

12. The method as recited in claim 11 further comprising, after the high pressure/high temperature process, subjecting the cutting element to a heat treatment of greater than about 500° C., wherein after the heat treatment the diamond body has a compressive stress of greater than about 0.9 GPa.

13. The method as recited in claim 11 wherein the substrate comprises chromium carbide in the range of from about 0.02 to 2 percent by weight of the total weight of the substrate.

14. The method as recited in claim 11 wherein the substrate has a magnetic saturation of from about 73 to 87 percent and a coercivity of from about 200 to 300 Oe.

15. The method as recited in claim 11 further comprising treating the cutting element to provide a thermally stable region extending a partial depth from a working surface of the diamond body, the interstitial regions within the thermally stable region being substantially free of the catalyst material.

16. The method as recited in claim 15 wherein the diamond-bonded body comprises an untreated region interposed between the thermally stable region and the substrate, the interstitial regions in the untreated region comprising the catalyst material.

* * * * *